United States Patent
Moore

(10) Patent No.: US 7,778,196 B2
(45) Date of Patent: Aug. 17, 2010

(54) METHOD AND APPARATUS FOR LINK PERFORMANCE MEASUREMENTS IN A PACKET-SWITCHED NETWORK

(75) Inventor: Sean S. B. Moore, Hollis, NH (US)

(73) Assignee: Avaya Inc., Basking Ridge, NJ (US)

( * ) Notice: Subject to any disclaimer, the term of this patent is extended or adjusted under 35 U.S.C. 154(b) by 1001 days.

(21) Appl. No.: 11/141,366

(22) Filed: May 31, 2005

(65) Prior Publication Data

US 2006/0268731 A1 Nov. 30, 2006

(51) Int. Cl.
G06F 11/34 (2006.01)
H04L 12/26 (2006.01)

(52) U.S. Cl. .............. 370/252; 370/232; 709/224; 709/238

(58) Field of Classification Search .......... 370/232, 370/238, 252, 517, 519; 709/238
See application file for complete search history.

(56) References Cited

U.S. PATENT DOCUMENTS

| | | | | |
|---|---|---|---|---|
| 6,061,331 A | * | 5/2000 | Conway et al. | 370/232 |
| 7,065,584 B1 | * | 6/2006 | Shavitt et al. | 709/241 |
| 7,146,353 B2 | * | 12/2006 | Garg et al. | 707/2 |
| 2004/0044765 A1 | * | 3/2004 | Meek et al. | 709/224 |

FOREIGN PATENT DOCUMENTS

WO    WO03/019532 A1 * 3/2003

OTHER PUBLICATIONS

Joe et al., A General Introduction to Tomography & Link Delay Inference with EM Algorithm, Feb. 21, 2004, http://web.archive.org/web/20060509091226/http://www.cse.cuhk.edu.hk/~cslui/STUDY_GROUP/tomography.ppt.*
Coates et al., Internet Tomography, May 2002, IEEE Signal Processing Magazine, p. 47-65.*

* cited by examiner

Primary Examiner—Aung S Moe
Assistant Examiner—Hoon J Chung
(74) Attorney, Agent, or Firm—Joseph B. Ryan; Jason Paul DeMont; Wayne S. Breyer

(57) ABSTRACT

Methods and apparatus are provided for measuring and evaluating access link performance in IP networks that reduce the amount of required test traffic. Performance values supported by access links in a packet network that interconnects regions of an enterprise network are evaluated by (i) obtaining a plurality of test measurements for a set of N access links; (ii) formulating a matrix equation (Ax=D), where A is an invertible matrix, such as a Hadamard matrix, x is a vector of unknown access link performance parameters and D is a vector based on the plurality of test measurements; (iii) assigning one or more numeric values to one or more unproducible equations in the matrix equation based on one or more system properties; and (iv) obtaining a performance parameter value on each directed edge for the set by applying an inverse matrix $A^{-1}$ to each side of of the matrix equation.

13 Claims, 2 Drawing Sheets

METHOD AND APPARATUS FOR LINK PERFORMANCE MEASUREMENTS IN A PACKET-SWITCHED NETWORK

FIELD OF THE INVENTION

The present invention relates generally to communication methods and systems, and more particularly, to methods and systems for performance measurements supporting higher-level functions, such as admission control, path switching, performance monitoring, and problem isolation, in a packet-switched network.

BACKGROUND OF THE INVENTION

Generally, the Internet Protocol (IP) and IP networks have been designed to support a single, best-effort class of service. IP networks have successfully transported TCP-mediated data traffic more cost-effectively and flexibly than other popular network types, e.g., circuit-switched networks. As a result, there is a convergence effort to migrate all networked applications, such as voice and videoconferencing applications, to use IP networks as the common transport medium. Best-effort service, however, is not sufficient to meet the Quality-of-Service (QoS) needs of some of these migratory applications, especially in an enterprise environment. Hence, the IP networking industry has been developing QoS solutions with differentiated services that provide different levels of transport performance in accordance with the needs of higher level applications.

A part of many QoS solutions is performance measurement, and specifically the measurement of the current delay, jitter (delay variance), and packet loss probability values for packet traffic traversing communications links connecting routers and switches and traversing multi-hop switched and routed paths through the network. Measured delay, jitter, and packet loss probability values may be used in the decision processes of higher-level functions such as an admission control system, which governs which traffic enters the network.

Admission control is required, for example, to support QoS for many inelastic applications. A number of techniques have been proposed or suggested for admission control in packet-switched networks. For example, U.S. patent application Ser. No. 11/111,464, entitled "Method and Apparatus for Quality-of-Service-Based Admission Control," incorporated by reference herein, discloses QoS-based admission control (QBAC) techniques for a packet network.

Performance measurement techniques may be categorized as passive, active, or hybrid. Passive techniques measure statistics of actual bearer (non-synthetic) traffic. Active techniques probe the network with synthetic traffic. Hybrid techniques combine passive and active methods to improve accuracy and reduce active traffic loads. Probing a network with test traffic can potentially affect the performance of bearer traffic. Thus, it is important to minimize the complexity of the test architecture, i.e., to use the minimum amount of test traffic necessary to collect the required information.

When it is possible to observe the traffic that enters and exits both ends of an individual link, then measuring the transport performance supported by the link is relatively straightforward. Often, however, geographically distributed enterprises contract with service providers to provide wide-area network (WAN) interconnectivity for connecting their local-area networks (LANs) together to form internetworks. In such cases, the enterprise cannot observe the traffic entering and exiting the access link termination point in the service providers' networks. Because access links are often the bottleneck links in a network and therefore primary contributors to degradation in transport QoS, performance measurements for these access links are critical for QoS management and support of higher-level functions. In this case, naive methods exist to collect the performance measurements needed to support higher level functions, but they generate too much test traffic, i.e., the test traffic volume is large enough to significantly affect the transport performance of application traffic.

A need therefore exists for methods and apparatus for measuring and evaluating access link performance in IP networks that reduce the amount of required test traffic.

SUMMARY OF THE INVENTION

Generally, methods and apparatus are provided for measuring and evaluating access link performance in IP networks that reduce the amount of required test traffic. According to one aspect of the invention, performance values supported by access links in a packet network that interconnects regions of an enterprise network are evaluated by (i) obtaining a plurality of test measurements for a set of N access links (e.g., at least 3N test measurements); (ii) formulating a matrix equation ($Ax=D$), where A is an invertible matrix, such as a Hadamard matrix, x is a vector of unknown access link performance parameters and D is a vector based on the plurality of test measurements; (iii) assigning one or more numeric values to one or more unproducible equations in the matrix equation based on one or more system properties; and (iv) obtaining a performance parameter value on each directed edge for the set by applying an inverse matrix $A^{-1}$ to each side of the matrix equation.

According to another aspect of the invention, numeric values are assigned to one or more unproducible equations in the matrix based on one or more system properties, such as a system property that recognizes that net traffic into and out of the set of access links has an expected value, such as an expected value of approximately zero. The performance values may comprise, for example, one or more of current delay, delay variance, and packet loss probability values for packet traffic traversing one or more of the access links.

A more complete understanding of the present invention, as well as further features and advantages of the present invention, will be obtained by reference to the following detailed description and drawings.

DETAILED DESCRIPTION

Figure 1:
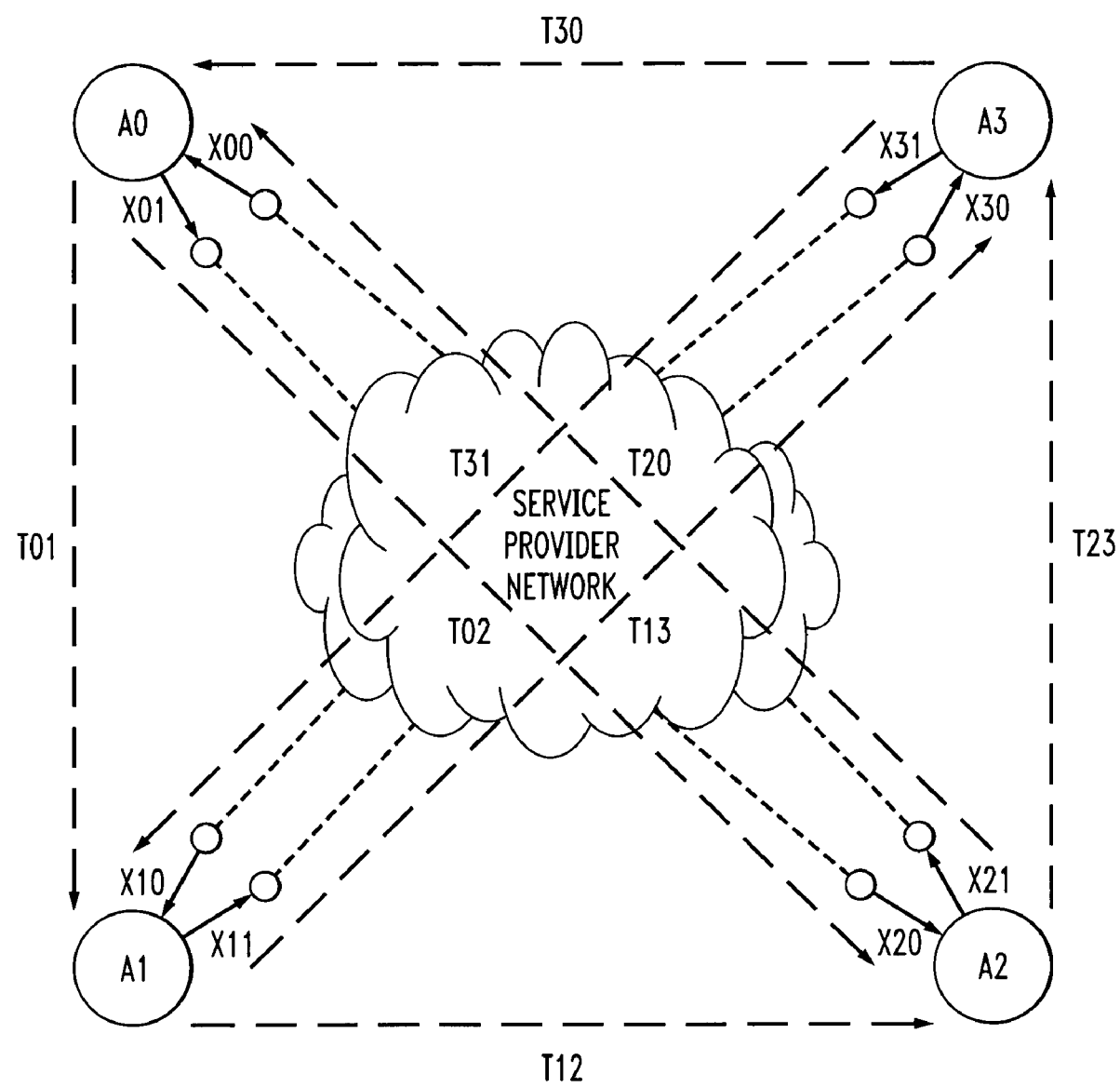
FIG. 1 illustrates a network environment in which the present invention can operate.

A typical enterprise network consists of a collection of local-area networks (LANs) interconnected using private-line WAN connectivity or service provider network connectivity, or a combination of the foregoing. Typically, the physical bandwidth of the LANs is much greater than the bandwidth of the private lines and/or the access links connecting LANS with the service provider network. Service provider networks also typically have bandwidth that is much greater than the access links. Hence, private lines and access links are usually the "bottleneck" links in a wide-area network (WAN). Bottleneck links often become congested, i.e., the current packet traffic load exceeds the link capacity. During congestion episodes, the router or switch terminating the bottleneck link enqueues incoming packets. Packet queueing causes additional delays beyond the "speed-of-light" propagation delays and also induces jitter in individual microflows. During prolonged episodes of congestion, packet queues may fill up, in which case incoming packets are dropped. Queueing delay, jitter, and packet loss sourced by congested bottleneck links is a major source of QoS degradation for some applications, such as IP telephony using the Voice-over-IP (VoIP) protocol, IP-based videoconferencing, and so-called "IP circuit emulation" applications, such as FAX-over-IP (FoIP) and Teletype-over-IP (TTYoIP).

Thus, a critical component of any enterprise's QoS management solution is timely measurement and estimation of the current delay, jitter, and loss probability values sourced by bottleneck links. When private-line interconnectivity is used, the enterprise often owns, controls, or otherwise has unfettered access to the routers, switches, and/or host devices that terminate both ends of the private line. In this case, it is straightforward for the enterprise to instrument both ends of the private line and then measure the delay, jitter, and loss probability experienced by actual packet flows or synthetic packet traffic traversing the link. The measured values may then be used as input to higher-level QoS management functions such as admission control, performance monitoring, problem isolation, and path switching.

For cost and availability reasons, enterprises may use so-called service provider interconnectivity instead of private lines to interconnect their LANs. A service provider owns a packet-switching network infrastructure and offers packet transport services to clients, such as geographically distributed enterprises. Enterprises purchase or lease access links that connect their LANs to the closest access point, or point-of-presence (POP), of the service provider network. Packet traffic that is sourced and sunk in two different LANs traverses an access link from the source LAN to the service provider network, and upon exit from the service provider network traverse another access link to reach the destination LAN. As the access links are bottleneck links, a QoS management solution will want to know the current transport performance (delay, jitter, loss probability) supported by the access links. Unlike the case of private-line interconnectivity, enterprises neither own nor have access to the switching devices that terminate the access links at the service provider POPs, so the enterprise cannot instrument both ends of an access link and thereby directly measure the link's transport performance attributes.

The enterprise can instrument the termination points of access links that terminate at devices that they own. Hence, the enterprise can measure the delay, jitter, and loss probability values for the path between two LANs. Paths between LANs are composed of two access links and links internal to the service provider network. Given values of delay, jitter, and loss probability for a single path, it is not possible to know the individual contributions of each access link to the path's performance values. For example, suppose the measured delay across a path is 100 ms. The delay contributed by the two access links is represented as the variables $x_1$ and $x_2$, and the delay contributed by the service provider network is $x_3$; then $x_1+x_2+x_3=100$ ms, but without more equations in the $x_i$, it is impossible to solve for the $x_i$. In the terminology of linear systems, the number of variables with unknown values exceeds the number of linearly independent equations in those variables, and therefore the system of variables cannot be solved.

One method for collecting necessary performance measurements to support some higher-level applications is to measure the performance of each path between every pair of LANs in the enterprise network. Such a method obviates the need for performance information on individual links. The problem with this approach is that it does not scale, as follows: If there are N LANs in the WAN, and therefore N access links (there may be more in a multi-homed configuration), then there is on the order of $N^2$, or $O(N^2)$, pairs of LANs, and therefore $O(N^2)$ measurements that need be collected. A large enterprise may have hundreds or even thousands of LANs, in which case there may be on the order of millions of measurements that need to be collected as well as a large system of equations to be solved. If timely or "fresh" performance estimates are needed, which is the case for functions such as admission control and path switching, then most of these measurements will need to be gathered using active measurement methods and refreshed at a relatively high rate, in which case the WAN is at risk of being flooded with synthetic measurement traffic, which will degrade the performance of actual applications traffic. This defeats the purpose of the QoS management systems that the performance measures are supporting.

Another class of methods for estimating the contributions of individual links are referred to as tomographic methods. The method of the present invention is a tomographic method, but it differs significantly from existing tomographic methods in scope and in technique. Existing tomographic methods estimate the performance of every internal link in the target network, compute network topology, use complex statistical inference techniques to estimate performance parameters, and are not suitable for providing accurate and timely performance information for higher-level functions, such as admission control. An example of an existing tomographic method is found in United States Patent Application Serial No. 20020116154 entitled "Network Tomography Using Closed Spaced Unicast Packets."

For a typical enterprise applying QoS management, neither performance information on every internal link in the network nor network topology information is necessary for QoS management. An enterprise has no control over the links in the service provider network, nor can the enterprise dictate the service provider topology. Thus, the enterprise cannot take action to mitigate a performance problem. The most important links for an enterprise to measure are the access links. An existing tomographic method will provide performance information on access links but will do so using more traffic and computational processing resources than is necessary, and may not be able to provide timely information without using a large amount of test traffic. The present invention uses a minimal amount of test traffic and a simple, non-statistical technique to compute access link performance information, and is therefore well-suited to support higher-level QoS management functions such as admission control.

More formally, the links of interest in a network (the bottleneck links) and the collection of measurement tests used to gather performance data for all of the links of interest are said to form a test architecture. The complexity of a test architecture measures the number of tests as a function of the number of links of interest. For example, the test architecture described above that measures every path between each pair of LANs contains N access links and has a complexity of $O(N^2)$.

As described below, the present invention includes a method for estimating performance values of the access links in a WAN using a test architecture with complexity function that is linear in the number of access links. Specifically, if there are A access links connecting to service provider networks, then the number of necessary test measurements is of the same order as the number of access links, or equivalently the complexity of the corresponding test architecture is O(A). Note that A may exceed N, the number of LANs, because enterprises often use multihoming, i.e., there are multiple access links per LAN because the enterprise contracts with two or more service providers.

Efficient Test Architectures for Networks using Service Provider Interconnectivity The present invention affords an efficient test architecture, i.e., a test architecture with O(A) complexity, that is applicable to networks using service provider networks for interconnectivity between LANs. FIG. 1 illustrates an exemplary network environment 100 in which the present invention can operate. As shown in FIG. 1, a number of different network regions A0 through A3, such as enterprise LANs, are interconnected by a service provider IP network 110. The service provider network is modeled as a "cloud" 110 that interconnects the network regions A0 through A3. The cloud 110 is accessed through access links, $x_{ij}$. The access links are typically lower-speed bottleneck links, such as T1 lines. Unlike the private line case, a test flow will traverse two access links instead of just one private line, since a test source or sink can not be placed within the provider network 110. While one could gather all of the performance measurements needed by higher-level QoS management functions by executing tests that traverse every pair of access links, this would be an $O(A^2)$ test architecture, where A is the number of access links. Such a test architecture becomes impractical as the number of access links increases.

The disclosed test architecture for the case of service provider connectivity reduces the test architecture complexity to O(A). Without loss of generality, it is assumed that the access links are bidirectional. Since the ingress and egress traffic traversing each access link are not identical, however, an access link is modeled as a pair of unidirectional links $x_{00}$ and $x_{01}$; $x_{10}$ and $x_{11}$; $x_{20}$ and $x_{21}$; and $x_{30}$ and $x_{31}$.

In one exemplary embodiment of the present tomographic method, four access links are randomly selected, and four nodes $A_0$, $A_1$, $A_2$, and $A_3$ are created in a graph that are identified with the termination points of the access links. Each node $A_n$, has two directed edges adjacent to it. Eight unidirectional tests $T_{01}$, $T_{12}$, $T_{23}$, $T_{30}$, $T_{02}$, $T_{20}$, $T_{13}$, and $T_{31}$ are defined, where the subscript ij indicates that the test traverses the path between node $A_i$ and $A_j$, so that each access link can be associated with a test that traverses each direction (ingress and egress) of the link. The access links are identified with directed edges that connect nodes $A_n$ with a graph representing the provider network 110. These directed edges are labeled $x_{00}$, $x_{01}$, $x_1$, $x_{11}$, $x_{20}$, $x_{21}$, $x_{30}$, $x_{31}$ in FIG. 1. Note that the subscripting is different for the edges $x_{ik}$ than for the tests $T_{ij}$. For edges $x_{ik}$, the first subscript i indicates the node $A_i$ adjacent to the edge, and the second subscript k has a value of 0 or 1 to discriminate between the two edges adjacent to the node $A_i$ with 0 being assigned to the ingress/incoming link and 1 being assigned to the egress/outgoing link. Thus, a test $T_{ij}$ traverses the pair of edges $(x_{i1}, x_{j0})$.

The intent of the tests $T_{ij}$ is to directly measure the value of some QoS parameter associated with each access link. For simplicity and without loss of generality, it is assumed that the QoS parameter is a delay parameter. Then for each edge $x_{ik}$, an unknown delay value $x_{ik}$ is associated with each edge. Note that for notational simplicity we are identifying each edge $x_{ik}$ with the temporal delay value it provides. Each test $T_{ij}$ measures the total delay across two access links $x_{ik}$ and a path through the cloud 110. For example, $T_{01}$ measures a path delay $D'_{01}=x_{01}+x_{10}+$(cloud delay). For simplicity, assume that the cloud delay measured by any test is known (or can be estimated and is often provided in service level agreements between service providers and their clients) and approximately constant, which allows it to be eliminated from the equation by subtracting it from $D'_{01}$ to get $D_{01}=D'_{01}-$(cloud delay)$=x_{01}+x_{10}$. Thus, the eight tests $T_{ij}$ generate the following system of equations:

$$D_{01}=x_{01}+x_{10}$$

$$D_{12}=x_{11}+x_{20}$$

$$D_{23}=x_{21}+x_{30}$$

$$D_{30}=x_{31}+x_{00}$$

$$D_{02}=x_{01}+x_{20}$$

$$D_{20}=x_{21}+x_{00}$$

$$D_{13}=x_{11}+x_{30}$$

$$D_{31}=x_{31}+x_{10} \qquad (1)$$

It is noted that this system has eight equations and eight unknowns (the $x_1$ values), so a solution for the $x_{ik}$ value is readily determined if the equations are linearly independent. Let $x=(x_{01}\ x_{10}\ x_{11}\ x_{20}\ x_{21}\ x_{30}\ x_{31}\ x_{00})^T$, let $D=(D_{01}\ D_{12}\ D_{23}\ D_{30}\ D_{02}\ D_{20}\ D_{13}\ D_{31})^T$. Then the system of Eq. 1 has the matrix vector form $Ax=D$, where the matrix A is $$A = \frac{1}{\sqrt{2}}\begin{pmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \\ 1 & 0 & 0 & 1 & 0 & 0 & 0 & 0 \\ 0 & 0 & 1 & 0 & 0 & 1 & 0 & 0 \\ 0 & 0 & 0 & 0 & 1 & 0 & 0 & 1 \\ 0 & 1 & 0 & 0 & 0 & 0 & 1 & 0 \end{pmatrix} \qquad (2)$$

The equation $Ax=D$ in x has the solution $x=A^{-1}D$. Unfortunately, the matrix A of Eq. 2 is singular (non-invertible), so $A^{-1}$ does not exist. In fact, any matrix constructed as a system of equations based only on tests $T_{ij}$ and associated delay measurements $D_{ij}$ will be singular. This implies that the system of equations is not linearly independent, regardless of the number of nodes.

Typically, such situations are resolved by formulating a linearly independent equation in the unknowns based on one or more system properties and replacing one of the rows of A with a row corresponding to the independent equation. For example, state probability systems with unknowns $p_i$, which represent the probability that the system is in state i, use an independent normalizing equation $\Sigma_i p_i=1$, i.e., the sum of all of the state probabilities for the system must be one. The present invention employs the use of a similar linearly independent equation derived from some system property rather than from measurement tests to construct an invertible matrix which may be applied to D and thereby solve for x.

The method of the present invention first identifies a matrix that is known to be invertible and then map tests $T_{ij}$ and measurements $D_{ij}$ to the matrix rows and a corresponding matrix equation. Because the matrix is invertible, one or more of the rows cannot be mapped to the $T_{ij}$ and $D_{ij}$. Such rows correspond to independent equations, which must then be mapped to some system property.

Consider the Hadamard matrices $H_n$, recursively defined as follows:

$$H_1 = (1), H_{2n} = \left(\begin{array}{c|c} H_n & H_n \\ H_n & -H_n \end{array}\right)$$

For example, $$H_2 = \begin{pmatrix} 1 & 1 \\ 1 & -1 \end{pmatrix},$$

$$H_4 = \begin{pmatrix} 1 & 1 & 1 & 1 \\ 1 & -1 & 1 & -1 \\ 1 & 1 & -1 & -1 \\ 1 & -1 & -1 & 1 \end{pmatrix},$$

and $$H_8 = \begin{pmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{pmatrix}$$

Hadamard matrices are non-singular; in fact, $H_n^{-1} = H$ when $H_n$ is properly normalized.

Applying $H_8$ to x and mapping delay measurements $D_{ij}$ to $H_8 x$ gives $$H_8 \begin{pmatrix} x_{01} \\ x_{10} \\ x_{11} \\ x_{20} \\ x_{21} \\ x_{30} \\ x_{31} \\ x_{00} \end{pmatrix} = \begin{pmatrix} D_{01} + D_{12} + D_{23} + D_{30} \\ ? \\ D_{01} - D_{12} + D_{23} - D_{30} \\ D_{02} + D_{20} - D_{31} - D_{13} \\ D_{01} + D_{12} - D_{23} - D_{30} \\ D_{03} + D_{10} - D_{12} - D_{32} \\ D_{01} - D_{12} - D_{23} + D_{30} \\ D_{03} + D_{32} - D_{21} - D_{10} \end{pmatrix} \quad (3)$$

Every row of $H_8$ maps to some combination of delay measurements $D_{ij}$ except the second row. If one examines the multiplication of the second row of $H_8$ and x $$(1 \; -1 \; 1 \; -1 \; 1 \; -1 \; 1 \; -1) \begin{pmatrix} x_{01} \\ x_{10} \\ x_{11} \\ x_{20} \\ x_{21} \\ x_{30} \\ x_{31} \\ x_{00} \end{pmatrix} = \quad (4)$$

$$x_{01} - x_{10} + x_{11} - x_{20} + x_{21} - x_{30} + x_{31} - x_{00}$$

and then compares the result (the right-hand side of Eq. 4) with FIG. 1, it can be seen that there is no set of tests $T_{ij}$ and associated delay measurements $D_{ij}$ that corresponds to the application of this second row of $H_8$ to the unknowns $x_{ik}$. This second row corresponds to unidirectional tests that traverse two ingress links or two egress links, which is impossible. Formally, there is no set of tests $T_{ij}$ that will produce delay measurements $D_{ij}$ that can be linearly combined in such a way as to equal the right-hand side of Eq. 4. In general, we refer to a row of an invertible matrix that has this property as an unproducible row and the associated equation formed by applying an unproducible row to a vector x of unknowns as an unproducible equation.

Also note that Equation (3) uses delay measurements $D_{10}$, $D_{21}$, $D_{32}$, and $D_{03}$ that are not identified in Equation (1). Specifically, these delay measurements are the equations $$D_{10} = x_{11} + x_{00}$$

$$D_{21} = x_{21} + x_{10}$$

$$D_{32} = x_{31} + x_{20}$$

$$D_{03} = x_{01} + x_{30} \quad (5)$$

The $D_{ij}$ values of Equation (5) need be collected using tests $T_{10}$, $T_{21}$, $T_{32}$, and $T_{03}$ that are in addition to the tests identified in FIG. 1.

For this exemplary Hadamard matrix and test set, Equation 4 is the independent (unproducible) equation that must be assigned a numeric value by identifying it with some system property, which will then admit a solution for the unknowns x. Assume that the distribution of traffic load is random, that the delay values x for the (arbitrarily selected) access links are uncorrelated, and for simplicity that the access links all have the same capacity. Partition the set of unknowns $\{x_{ik}\}$ into two sets $S_0\{x_{01}, x_{11}, x_{21}, x_{31}\}$ and $S_1 = \{x_{00}, x_{10}, x_{20}, x_{30}\}$ corresponding to delay values for egress/outgoing links and ingress/incoming links, respectively. Because of the assumptions, the expected values of the sum of the elements in $S_0$ and $S_1$ are equal. Equivalently, the expected value of the subtraction of the elements in $S_1$ from the elements in $S_0$ is zero, which is then the value of the right-hand side of Eq. 4. In other words, the present invention recognizes that the expected value of the net traffic into and out of the four nodes is zero. Hence, we assign the value 0 to the unproducible Equation 4. Substitution into Equation 3 gives $$H_8 \begin{pmatrix} x_{01} \\ x_{10} \\ x_{11} \\ x_{20} \\ x_{21} \\ x_{30} \\ x_{31} \\ x_{00} \end{pmatrix} = \begin{pmatrix} D_{01} + D_{12} + D_{23} + D_{30} \\ 0 \\ D_{01} - D_{12} + D_{23} - D_{30} \\ D_{02} + D_{20} - D_{31} - D_{13} \\ D_{01} + D_{12} - D_{23} - D_{30} \\ D_{03} + D_{10} - D_{12} - D_{32} \\ D_{01} - D_{12} - D_{23} + D_{30} \\ D_{03} + D_{32} - D_{21} - D_{10} \end{pmatrix} \quad (6)$$

Representing Equation 6 as $H_8 x = D$, x can be solved for by applying $H_8^{-1}$ to both sides of Equation 5: $H_8^{-1} H_8 x = H_8^{-1} D \rightarrow x = H_8^{-1} D$.

The example above is for the case where the number of access links A=4, but the method generalizes to $A = 2^m$, where m an integer $\geq 2$, as follows. As in the exemplary A=4 case, label the A access points $0, 1, \ldots A-1$ and identify the ingress and egress links at each point as $x_{i0}$ and $x_{i1}$, respectively, for $i = 0, 1, \ldots A-1$. Define a set of tests $T_{01}, T_{12}, \ldots T_{A-2,A-1}$, $T_{A-1,0}, T_{10}, T_{21}, \ldots T_{A-1,A-2}, T_{0,A-1}$, and $T_{0,A/2}, T_{A/2,0}$, $T_{1,A/2+1}, T_{A/2+1,1} \ldots T_{A/2-1,A-1}, T_{A-1,A/2-1}$. Execution of this set of tests $T_{ij}$ produces the associated performance measurements $D_{01}, D_{12}, \ldots D_{A-2,A-1}, D_{A-1,0}, D_{10}, D_{21}, \ldots D_{A-1,A-2}$, $D_{0,A-1}$, and $D_{0,A/2}$, $D_{A/2,0}$, $D_{1,A/2+1}$, $D_{A/2+1,1}$ ... $D_{A/2-1,A-1}$, $D_{A-1,A/2-1}$. The associated matrix equation is $H_{2A}x=D$, where x is a vector composed of $x_{ik}$ variables representing the performance parameter of interest, and D is a vector of values composed of combinations of the $D_{ij}$ values and of zero values for the unproducible equations. Note that for A>4, there will be more than 1 unproducible equation. For example, for A=8, there are 5 unproducible equations. Also note that for Hadamard matrices, each of the unproducible equations can be identified with the system property that the net of traffic volume in and out of the network has an expected value of zero. Solve for the variables $x_{ik}$ by applying $H_{2A}^{-1}$ to both sides of the matrix equation to get $x=H_{2A}^{-1}D$. Repeat this entire procedure at the required rate, e.g., at the rate necessary to provide fresh performance data to a higher-level QoS management function such as admission control.

Service Provider Connectivity Test Process

Figure 2:
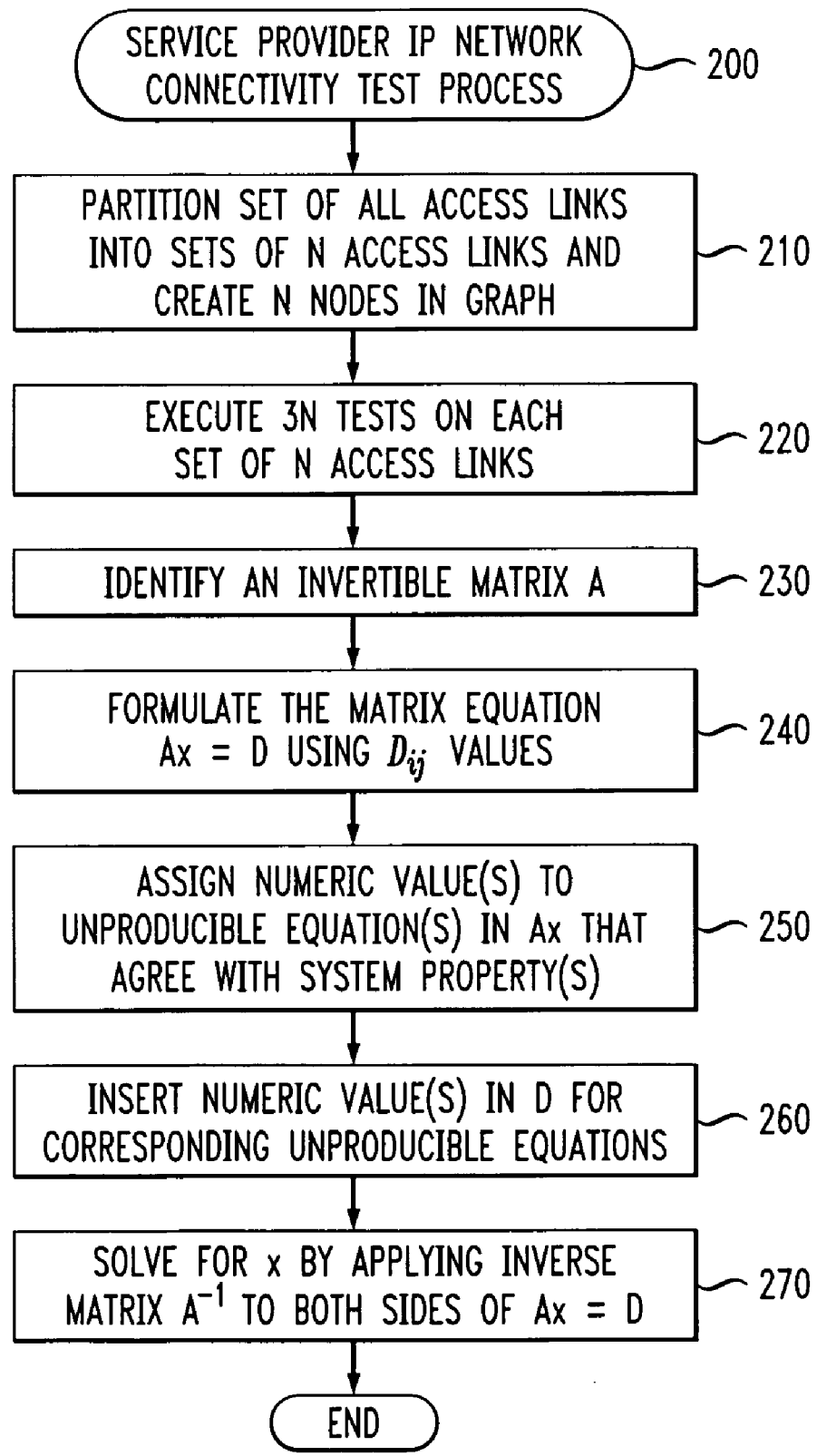
FIG. 2 is a flow chart describing an exemplary service provider IP network connectivity test process incorporating features of the present invention.

The above exemplary four-access-link solution provides a solution for the entire enterprise network using service provider interconnectivity 110. FIG. 2 is a flow chart describing an exemplary service provider IP network connectivity test process 200 incorporating features of the present invention. In one exemplary implementation, the service provider connectivity test process 200 can be implemented on any host H in the enterprise network, such as by an IP private branch exchange (PBX) associated with the network region, such as the Avaya Communications Manager™, commercially available from Avaya, Inc. of Basking Ridge, N.J. In further variations, the service provider IP network connectivity test process 200 can be implemented as a network service and reside on any node or host in the network 110, or it can be implemented as a network service that is distributed across a plurality of hosts or nodes in the network, as would be apparent to a person of ordinary skill in the art.

As shown in FIG. 2, the service provider IP network connectivity test process 200 initially partitions the set of all access links into sets of N access links (such as N equal to 4 in the exemplary embodiment) during step 210. If Hadamard matrices are used as the invertible matrix, then the sets of access links will be of size $2^m$, m an integer≧2. These sets need not be of the same size; for example, if the total number of access links A=28, then one partitioning of the access links has three partitions of size 16, 8, and 4, respectively, and the method would use the Hadamard matrices $H_{32}$, $H_{16}$, and $H_8$, respectively. Alternatively, a partition could consist of seven partitions of size 4, and only the $H_8$ matrix would be used. In addition, N nodes $A_0$, $A_1$, $A_2$, ... $A_{N-1}$ identified with the access links are created in a graph that are identified with the termination points of the access links. Each node has two directed edges representing the ingress and egress directions of the access link.

3N tests, such as tests $T_{01}$, $T_{12}$, $T_{23}$, $T_{30}$, $T_{02}$, $T_{20}$, $T_{13}$, $T_{31}$, $T_{10}$, $T_{21}$, $T_{32}$, and $T_{03}$ for an N=4 implementation, are executed during step 220 on each set of access links, to measure the delay values using equation (1). Each test $T_{ij}$ measures the delay encountered on a pair of directed edges, $x_{i1}$ and $x_{j0}$, as shown in FIG. 1, but the delay attribute individually contributed by each directed link in the pair is unknown.

A matrix A that is known to be invertible is identified during step 230, such as a Hadamard matrix. In step 240, the measurements $D_{ij}$ obtained from the tests are then used to populate the vector D of the matrix equation Ax=D with numeric values, where x is the vector of unknown access link delay values, except for the unproducible equation(s). As previously indicated, because the matrix is invertible, one or more of the equations in Ax cannot be mapped to a linear combination of the measured $D_{ij}$ values, i.e., they are unproducible equations as defined above. Each unproducible equation needs to be identified with some system property that admits a numeric value that can be assigned to it.

In step 250, a system property is identified with each unproducible row and a corresponding numeric value is assigned to the corresponding unproducible equations in agreement with one or more system properties. In the exemplary embodiment, N equals 4 and the unproducible row is (1 −1 1 −1 1 −1 1 −1). The set of unknowns $\{x_{ik}\}$ is partitioned into two sets $S_0=\{x_{01},x_{11},x_{21},x_{31}\}$ and $S_1=\{x_{00},x_{10},x_{20},x_{30}\}$ corresponding to the delay contributed by egress/outgoing links and ingress/incoming links, respectively. For the system of the exemplary embodiment, the expected value of the subtraction of the elements in $S_1$ from the elements in $S_0$ is zero. Accordingly, the corresponding unproducible equation is assigned the value zero.

In step 260, the numeric value(s) identified in step 250 are inserted in the appropriate locations in the vector D corresponding to unproducible equation(s). The matrix x indicating the delay on each directed link for the set is solved for during step 270 by applying the inverse matrix $A^{-1}$ to both sides of the system Ax=D, i.e., $A^{-1}Ax=A^{-1}D=_x$.

To estimate the end-to-end delay for any path traversing the service provider network, under the assumption that the majority of the delay due to resource contention is at the access links, and with known or upper bound values of delays across the service provider network core (typically available as part of Service Level Agreements (SLAs)), add the delay values of the two access links along the path to the core delay and any other known path delays to get the estimated end-to-end delay.

The test architecture associated with this solution has complexity O(A), where A is the total number of access links to the provider network. This is readily apparent, as each set of four (bidirectional) access links requires 12 tests, for a total of 3A tests for the entire set of access links.

Larger Hadamard matrices (i.e., $H_n$, n>8) may be used to increase the validity of the system condition assumption used in equation 5 that the expected values of the sum of the elements in $S_0$ and $S_1$ are equal without incurring a significant increase in computational complexity (provided, of course, that the number of access links A≧n/2), as would be apparent to a person of ordinary skill in the art. Although in general the application of an n×n matrix such as $H_n$ to a vector has a computational complexity O($n^2$), the special structure of Hadamard matrices admits application with O(n lg n) complexity by using generalized fast Fourier transform techniques. Thus, increasing n does not cause scalability problems in the computation of $H_n^{-1}D$.

For simplicity, the system condition assumptions used in Eq. 5 include an assumption that the access link capacities are equal. If the access link capacities are not equal, then appropriate adaptations may be made to the process. One adaptation would be to partition the set of access links by link capacity and then apply the process to each partition, in which case the assumption of equal link capacities holds. Alternatively, the measured delay value $D_{ij}$ could be weighted, or normalized, to account for the difference in link capacities. Another alternative is to use a non-zero expected value that corresponds to the non-zero net traffic that ingresses and egresses the set of links.

If A mod 4≠0, or more generally, if A mod $2^j$≠0, this may be handled by choosing matrices of various sizes, with sizes restricted to powers of 2, such that the sum of the sizes adds up to A. A difficulty may arise if A mod 4≠0, as 1-, 2-, or 3-node test architectures can't be physically implemented given current routing technology (a "hairpin" capability would be required which is not necessarily available in all routers/ switches). This is readily handled by including the appropriate number of access links in multiple 4- or (n-) node access link test sets (which means that the partitioning of access links is no longer a partition). The inclusion of some access links in more than one 4-node (or n-node) test set may result in more accurate results, as one will gather two QoS measurements on the access links instead of just one. Extending this idea, it may be useful to have two (or more) different partitionings of A, in which none of the partitionings are equal, as this increases the number of QoS measurements per access link. The cost of doing so is an increased traffic load, but the increase may still have a neglible effect on bearer traffic performance.

Another application of this approach is in scenarios where round-trip testing is used, i.e., performance statistics are gathered at the source point only and not the sink (the sink functions only as a volley/loopback mechanism). Only the round-trip delay is measured, but there may be a need to distinguish between the one-way delays. An appropriate modification to the disclosed method can determine one-way delays from round-trip measurement data, as would be apparent to a person of ordinary skill in the art.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

I claim:

1. A method comprising:
    (i) partitioning a set of bidirectional access links into subsets, wherein each bidirectional access link comprises an ingress unidirectional link and an egress unidirectional link, and wherein the set of bidirectional access links is part of a packet telecommunication network;
    (ii) identifying a subset comprising N bidirectional access links, wherein N is a positive integer;
    (iii) executing, in the packet telecommunication network, 3N tests, $T_{ij}$, to generate 3N test results, $D_{ij}$, wherein i and j are integers in the range [1, N], and wherein i and j denote a pair of bidirectional access links being tested from the subset comprising N bidirectional access links;
    (iv) identifying an invertible matrix, A, of size 2N by 2N;
    (v) mapping a first half of the rows of A to N ingress unidirectional links from the subset comprising N bidirectional access links, and mapping a second half of the rows of A to N egress unidirectional links from the subset comprising N bidirectional access links;
    (vi) formulating at least one equation based on the elements of one row of A, wherein the at least one equation interrelates a performance parameter of a unidirectional link with a subset of the 3N test results;
    (vii) generating at least one estimate of the performance parameter of a unidirectional link based on a solution of the at least one equation; and
    (viii) operating the packet telecommunication network based on the value of the at least one estimate of the performance parameter of a unidirectional link.

2. The method of claim 1 wherein the 3N tests, $T_{ij}$, comprise:
    (i) a set of N distinct tests: $T_{12}, T_{23}, \ldots, T_{N-1, N}, T_{N1}$, wherein the subscripts of the first N-1 tests are pairs of consecutive integers in increasing order;
    (ii) a set of N distinct tests: $T_{21}, T_{32}, \ldots, T_{N, N-1}, T_{1N}$, wherein the subscripts of the first N-1 tests are pairs of consecutive integers in decreasing order; and
    (iii) a set of N distinct tests: $T_{1, 1+N/2}, T_{1+N/2, 1}, T_{2, 2+N/2}, T_{2+N/2, 2}, \ldots, T_{N/2, N}, T_{N, N/2}$, wherein the subscripts of each test differ from one another by N/2.

3. The method of claim 1 wherein the invertible matrix, A, is a Hadamard matrix.

4. The method of claim 1 wherein the performance parameter of a unidirectional link is a delay.

5. The method of claim 1 wherein the performance parameter of a unidirectional link is a jitter.

6. The method of claim 1 wherein the performance parameter of a unidirectional link is a packet loss probability.

7. The method of claim 1 wherein operating the packet telecommunication network comprises an admission control.

8. An apparatus comprising: a data-processing system for probing a performance parameter of a packet telecommunication network, wherein the data-processing system:
    (i) partitions a set of bidirectional network access links into subsets, wherein each bidirectional network access link comprises an ingress unidirectional link and an egress unidirectional link;
    (ii) identifies a subset comprising N bidirectional network access links, wherein N is a positive integer;
    (iii) executes, in the packet telecommunication network, 3N tests, $T_{ij}$, to generate 3N test results, $D_{ij}$, wherein i and j are integers in the range [1, N], and wherein i and j denote a pair of bidirectional network access links being tested from the subset comprising N bidirectional network access links;
    (iv) identifies an invertible matrix, A, of size 2N by 2N;

(v) maps a first half of the rows of A to N ingress unidirectional links from the subset comprising N bidirectional network access links, and maps a second half of the rows of A to N egress unidirectional links from the subset comprising N bidirectional network access links;

(vi) formulates at least one equation based on the elements of one row of A, wherein the at least one equation interrelates a performance parameter of a unidirectional link with a subset of the 3N test results; and (vii) generates at least one estimate of the performance parameter of a unidirectional link based on a solution of the at least one equation.

9. The apparatus of claim 8 wherein the 3N tests, $T_{ij}$, comprise:

(i) a set of N distinct tests: $T_{12}, T_{23}, \ldots, T_{N-1, N}, T_{N1}$, wherein the subscripts of the first N-1 tests are pairs of consecutive integers in increasing order;

(ii) a set of N distinct tests: $T_{21}, T_{32}, \ldots, T_{N, N-1}, T_{1N}$, wherein the subscripts of the first N-1 tests are pairs of consecutive integers in decreasing order; and (iii) a set of N distinct tests: $T_{1, 1+N/2}, T_{1+N/2,1}, T_{2,2+N/2}, T_{2+N/2,2}, \ldots, T_{N/2, N}, T_{N,N/2}$, wherein the subscripts of each test differ from one another by N/2.

10. The apparatus of claim 8 wherein the invertible matrix, A, is a Hadamard matrix.

11. The apparatus of claim 8 wherein the performance parameter of a unidirectional link is a delay.

12. The apparatus of claim 8 wherein the performance parameter of a unidirectional link is a jitter.

13. The apparatus of claim 8 wherein the performance parameter of a unidirectional link is a packet loss probability.

* * * * *